May 22, 1945.  R. C. BROTZ  2,376,655
APPARATUS FOR PREPARING OR CONDITIONING MOLDING
MATERIALS JUST PRIOR TO THEIR MOLDING
Original Filed Oct. 15, 1943
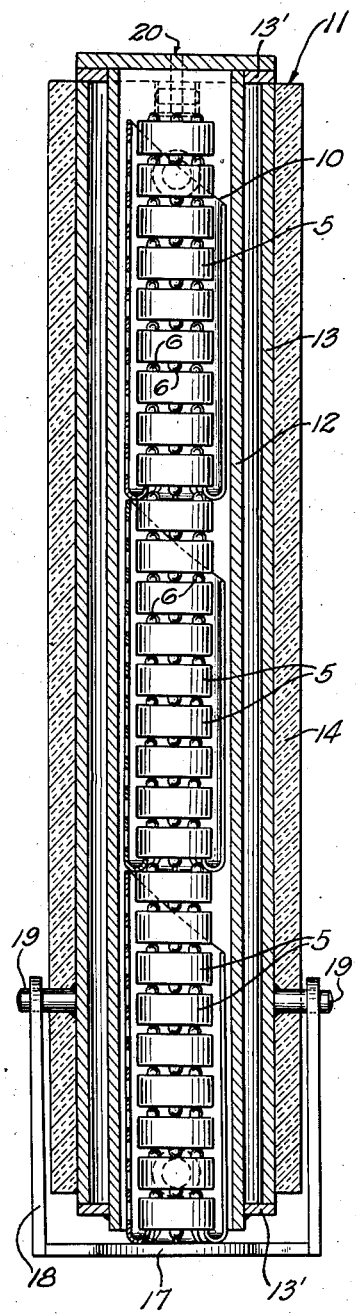
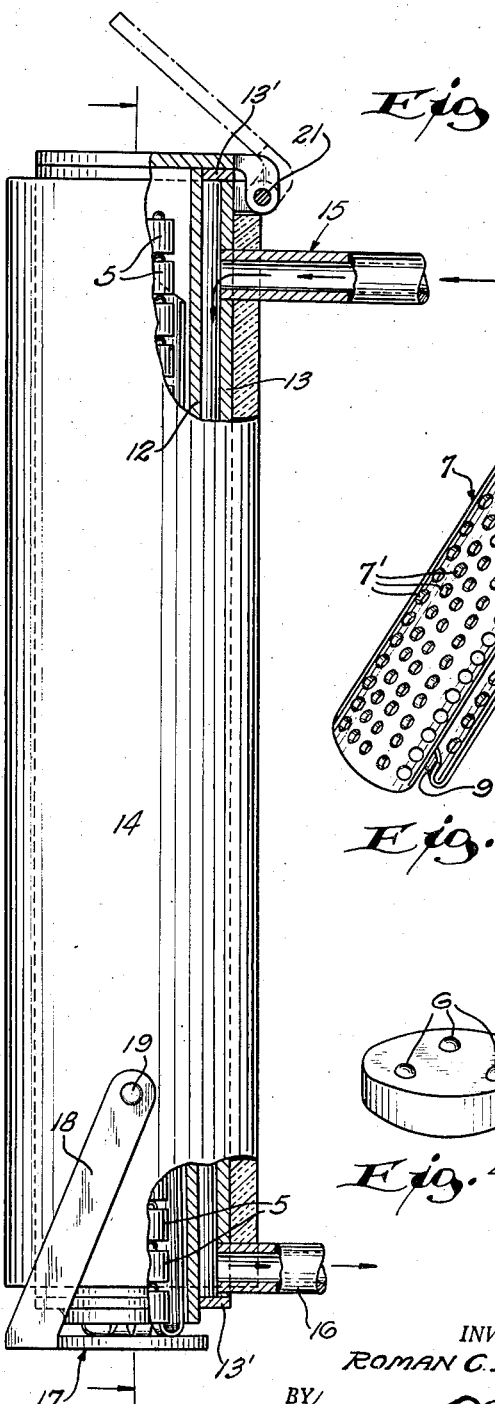
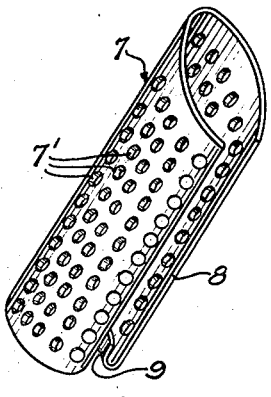
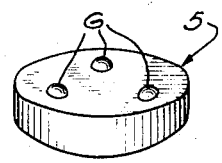
INVENTOR.
ROMAN C. BROTZ.
BY William F. Buckley
ATTORNEY.

Patented May 22, 1945

2,376,655

UNITED STATES PATENT OFFICE 2,376,655

APPARATUS FOR PREPARING OR CONDITIONING MOLDING MATERIALS JUST PRIOR TO THEIR MOLDING

Roman C. Brotz, Sheboygan, Wis.

Original application October 15, 1943, Serial No. 506,399. Divided and this application February 28, 1944, Serial No. 524,180

5 Claims. (Cl. 263—2)

This invention relates to an apparatus for preparing or conditioning molding materials just prior to their molding and may be used to advantage with either compression or transfer molding.

This application is a division of my application for Apparatus for and process of preparing molding materials for molding, filed October 15, 1943, Serial No. 506,399.

Preheating of the material has been accomplished formerly by the use of hot air ovens, electrically heated ovens and platens either heated by steam or electricity. The disadvantages of these various old methods are namely:

1. Inefficiency of heat transfer.
2. Lack of uniformity in heating.
3. Additional handling of material.
4. Difficult control due to opening of door with resultant loss of heat, cold drafts entering, and generally non-uniform circulation.

In either compression or transfer methods of molding for thermosetting compounds the final shape being molded is subjected to heavy pressures and heat which subsequently causes it to cure or set as a hard rigid self-subsisting mass. In the case of thermo-plastic materials, hot fluid molding compounds are subjected to pressure, are formed in warm dies and chilled, or are injected hot into chilled dies to cause them to become rigid self-sustaining forms.

It is therefore evident that whatever heat and fluidity the material possesses before being subjected to heat and pressure in the die, is an advantage as the time element which this operation requires has been decreased. If normally, one pound of thermosetting molding material requires 100 B. t. u. to cure or set it, and it is possible for the material to absorb 80 B. t. u. before it is subjected to additional heat and pressure in a press, the time element for final curing in the press will require only an additional 20 B. t. u. as against 100 B. t. u. had the material been at room temperature when placed in the die.

Experience has demonstrated it practical to double and in some cases triple production using the same tools and equipment as was formerly used with older methods. Especially is this true of injection or transfer molding methods of molding when using thermosetting compounds. In this process fluidity plays a very important part as the material is placed in a pressure chamber, is subjected to pressure and passed through sprues and gates before finally entering the forming cavity. Fluidity or plasticity is therefore desirable as it augments or assists the molding operation in many ways. Maximum fluidity of the material at the moment of molding can be accomplished in the most efficient manner only if the material is pre-heated to the correct degree before subjecting it to additional heat and the molding pressure.

The present invention proposes to speed up the molding cycle and at the same time to increase the quality of the objects molded, due to higher and more uniform density which this process permits. The extent to which the material is preheated varies, depending upon the charging pressure, the area and length of sprues, area of the gates and the curing temperature.

In actual commercial practice it has been found advantageous to have the material approach the same order as the molding temperature. The material can, within certain limits depending upon types of material, and forms to be molded, be preheated above the molding temperature. However, as it is economical and convenient to use the same source of heat as is used for the dies or molds, this preheating temperature is usually in the same neighborhood or range as the molding temperature.

To facilitate this desired preheating and the handling of the material before being molded, the present invention proposes to form up or shape the material before it is placed in the preheater. This densifying operation is known in the industry as preforming, and is done for several reasons, namely:

1. To decrease the bulk factor of the powder molded by making a pellet or disc tablet.
2. It is easier and cleaner to handle.
3. It simplifies the design or construction of the die as the "well" or retaining members of the die can be constructed with less height to contain the same weight of charge. This, furthermore, facilitates the cleaning of the die.

This tableting operating is not a new operation in the industry, however. I propose to provide on the upper and lower plane surfaces of the disc tablet a plurality of protuberances or bosses. These bosses are so arranged that when the discs or tablets are stacked one upon the other, there is a constant air gap between tablets. This air gap is of definite advantage as it increases the exposed area of each tablet by the areas of the upper and lower flats. This is roughly a 100% increase in exposed area, and materially effects the transfer of heat to the tablets effectively, especially when they are piled one above the other in stacks.

The present invention also proposes to provide cartridges or loading receptacles for containing and handling a measured charge of tablets. To better adapt the cartridges for their intended purpose, they are perforated to facilitate the transfer of heat and are also formed with a slot running lengthwise to facilitate the removal of the tablets from the cartridge after preheating.

The essential characteristics of the cartridges are that they can be so constructed as to provide for a surface transmission or interchange of heat, that they be so designed too, so that they may be internally loaded with a stack or pile of tablets, and that cartridges themselves may be piled one upon the other in a vertical manner. One convenient way of accomplishing this is to provide a metal cylinder dimensioned and proportioned to receive a vertical series of tablet filled cartridges and having surrounding this metal cylinder some source from which heat may be derived. This source could be an electrical heating element or the cylinder could be jacketed and hot oil, water, or steam be used for the heat source. An insulation covering is used over the outside to decrease heat losses. The cylinder through which the cartridges are sent is usually set up vertically so that the cartridges flow through to the bottom by gravity. A swinging gate is provided at the bottom of the cylinder to support the column of cartridges above, and a cap or cover is provided at the top of the cylinder to prevent a stack of flue effect during the preheating operation.

Some of the advantages derived from proper preheating are as follows:

1. Moldings made from properly preheated preforms have greater density and are more uniform in internal structure.

2. Increased production can be obtained as proper preheating decreases the curing time.

3. Moldings of greater intricacy may be made. Longer cored holes can be molded with a minimum amount of maintenance.

4. Relatively thick sections can be cured with very little increase in curing time over thin sections.

5. Because of the plasticity of the material one half the molding pressures may be used to mold the same articles, or twice the number of articles may be molded using the same pressures.

With the above recited objects and others of a similar nature in view, my invention resides in the construction, combination, and arrangement of the parts of the apparatus; all as set forth in and falling within the scope of appended claims.

In the accompanying drawing, forming a part of this specification:

Fig. 1 is a view in diametrical, vertical, cross section illustrating an apparatus embodying the present invention, parts being shown in elevation for the sake of illustration;

Fig. 2 is a view in side elevation of the apparatus shown in Fig. 1, parts being broken away and shown in vertical cross section for the sake of illustration;

Fig. 3 is a perspective view of one of the pellet holding cartridges; and

Fig. 4 is a perspective view of one of the preforms or pellets of the molding material.

Referring to the drawing it will be seen that the present invention proposes to form up or shape the molding material, before it is placed in the preheater, as a tablet or pellet of disk-like form, the pellet or tablet being designated generally at 5 and being shown in detail in Fig. 4. Each pellet 5 has its upper and lower plane surfaces, which are parallel to each other, formed with integral protuberances or bosses 6, angularly spaced from each other, or otherwise so arranged that when the discs or tablets are stacked or piled one upon another, there is an air gap between them. As a consequence, when the pellets or tablets are in stack formation approximately 100% of their area is exposed.

The pellets 5, when stacked, are received in cartridges designated generally at 7. The stack of pellets in each cartridge 7 provides a measured charge of molding material. The cartridges 7 are generally or approximately of cylindrical construction and are constituted of metal of good thermal conductivity. Their body portions are provided with a multiplicity of openings 7; or in other words are of foraminous construction to facilitate the transfer of heat. Furthermore, each cartridge 7 is formed with a slot 8 running lengthwise thereof to facilitate the removal of the pellets from the cartridge after preheating. The lower end of each cartridge 7 is provided with an integral flange 9 which curves inwardly and then upwardly to provide a support at the lower end of the cartridge for a pile or stack of pellets. The upper end of each cartridge is preferably cut away at an angle as illustrated at 10 in Fig. 1 to further facilitate handling of the pellets, that is, their insertion into and their removal from the cartridge.

The preheater, which is illustrated in Figs. 1 and 2 and designated generally at 11, may conveniently comprise an open end cylinder 12, constituted of metal of good thermal conductivity. Usually it is vertically disposed and preferably is located adjacent a molding press. It may be heated in any suitable way. In the construction illustrated the cylinder 12 is provided with a jacket 13 surrounding it substantially throughout its entire extent, the jacket being closed at its end by walls 13, welded or otherwise united and hermetically sealed to the cylinder as well as to the jacket.

An insulated covering 14 is provided for the jacket to decrease heating loss. An electric heating element could be placed in the jacket but usually it is preferred to circulate a fluid heating medium such as hot oil, hot water, or steam. In fact, in many instances the same heating medium that heats the press is also used to heat the jacket. In any event, the fluid heating medium is supplied at the upper end of the jacket through an inlet pipe 15 and is carried off at the lower end of the jacket by means of an offtake or discharge pipe 16.

A swinging gate designated generally at 17 is provided at the bottom of the cylinder 12 to support the column of cartridges therein. This gate may be, as illustrated in the drawing, a circular plate, suspended by suitable arms 18, from pivots 19 fixed to and projecting from the jacket 13. The gate, when closed, exercises its supporting function. It may be swung to one side of the preheater, to leave the lower end of the cylinder free and unobstructed, thus allowing the cartridges to slide out of the lower end of the cylinder by gravity.

A cap or cover 20 is provided for the upper end of the cylinder and may be pivotally mounted as at 21 on the jacket. The cap 20, when closed, prevents a stack or flue effect through the cylinder 12 during the preheating operation, and when open allows convenient loading of the cylinder.

While I have shown and described particular examples of the apparatus, it is to be understood that the example has been selected for purposes of illustration rather than limitation and that the scope of the invention and its variants are indicated by the appended claims.

What I claim is:

1. A preheater for molding material comprising a vertical open ended cylinder, a swingable gate closing the lower end of the cylinder in one position and leaving the same open and unobstructed in another position; a cover pivoted to the top of the cylinder and acting when closed to prevent a flue effect through the cylinder and means for heating the interior thereof.

2. A preheater for molding material comprising a vertically disposed open ended tubular body constituted of material of good thermal conductivity, a shiftable gate combined with the lower end of the body and acting in one position to close the lower end thereof and in another position leaving said lower end open, a cover shiftably supported on the upper end of the body and acting when closed to prevent a flue effect through the tubular body and when open to allow charging of the interior of the body, a series of pellet-receiving cartridges of foraminous construction and of good thermal conductivity designed to slide down through the tubular body when the gate is opened and to be supported therein one above the other and the gate is closed, and means for applying heat to the interior of the hollow body through the wall thereof.

3. A preheater for molding material comprising a vertically disposed open ended tubular body constituted of material of good thermal conductivity, a shiftable gate combined with the lower end of the body and acting in one position to close the lower end thereof and in another position leaving said lower end open, a cover shiftably supported on the upper end of the body and acting when closed to prevent a flue effect through the tubular body and when open to allow charging of the interior of the body, a series of pellet-receiving cartridges of foraminous construction and of good thermal conductivity designed to slide down through the tubular body when the gate is opened and to be supported therein one above the other when the gate is closed, a jacket surrounding the body, means for circulating a heating medium through the jacket and in direct heat-exchanging relationship with the hollow body, and an insulating covering for said jacket.

4. A preheater for molding material comprising a vertically disposed open ended cylinder constituted of material of good thermal conductivity, removable closures for the ends of the cylinder, means on the exterior of the cylinder for heating the interior thereof, a series of preform receiving cartridges supported one above the other in the cylinder and each containing a stack of preforms, said cartridges being of foraminous construction and having longitudinal slots therein to facilitate removal of the preheated preforms.

5. A preheater for molding material comprising a vertically disposed open ended cylinder constituted of material of good thermal conductivity, removable closures for the ends of the cylinder, means on the exterior of the cylinder for heating the interior thereof, a series of preform receiving cartridges supported one above the other in the cylinder and each containing a stack of preforms, said cartridges being of foraminous construction and having inturning flanges at their lower ends on which a stack of preforms are supported and also having lengthwise slots extending up through the upper end of the cartridge to facilitate removal of the preheated preforms.

ROMAN C. BROTZ.